US008428847B2

(12) United States Patent
Leufen et al.

(10) Patent No.: US 8,428,847 B2
(45) Date of Patent: Apr. 23, 2013

(54) IGNITION MODULE HAVING A BUS LINE

(75) Inventors: Heinrich Leufen, Schwaikheim (DE); Franz Mandl, Fellbach (DE); Eberhard Schieber, Backnang (DE); Georg Maier, Kernen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 311 days.

(21) Appl. No.: 12/941,402

(22) Filed: Nov. 8, 2010

(65) Prior Publication Data

US 2011/0108002 A1 May 12, 2011

(30) Foreign Application Priority Data

Nov. 9, 2009 (DE) ......................... 10 2009 052 488

(51) Int. Cl.
*G06F 19/00* (2011.01)

(52) U.S. Cl.
USPC ....... 701/102; 123/406.58; 123/605; 123/632

(58) Field of Classification Search .................. 701/102; 123/406.12, 406.13, 406.53, 406.57, 596, 123/605, 618, 620, 625, 632
See application file for complete search history.

(56) References Cited

U.S. PATENT DOCUMENTS 4,202,304 A * 5/1980 Jundt et al. .................... 123/618
4,809,667 A * 3/1989 Uranishi et al. .............. 123/520
4,922,874 A * 5/1990 DeBiasi et al. .......... 123/406.65
5,048,503 A * 9/1991 Suzuki et al. ................. 123/632
5,305,316 A * 4/1994 Yoshida et al. ............... 370/357
5,444,626 A * 8/1995 Schenk ......................... 701/102
6,029,630 A * 2/2000 Toyohara et al. ............. 123/480
6,123,057 A * 9/2000 Goras et al. ................ 123/406.2
6,397,280 B1 * 5/2002 Nitschke et al. .............. 710/110
6,864,599 B1 * 3/2005 Grosshauser ................ 307/10.6
6,888,265 B2 * 5/2005 Turner et al. ................. 307/10.2
7,400,641 B2 * 7/2008 Nitschke et al. .............. 370/445
2008/0041146 A1 * 2/2008 Leufen ............................ 73/116

FOREIGN PATENT DOCUMENTS

DE 10153846 A1 * 5/2003
JP 58214672 A * 12/1983
JP 06153517 A * 5/1994

* cited by examiner

*Primary Examiner* — Stephen K Cronin
*Assistant Examiner* — Joseph Dallo
(74) *Attorney, Agent, or Firm* — Walter Ottesen

(57) ABSTRACT

The invention relates to a portable hand-guided work apparatus having an internal combustion engine (10) for driving a work tool (5). A combustion chamber (12) is formed in a cylinder (11) of the engine (10) and is delimited by a piston (13) which drives a crankshaft (14) in rotation. A spark plug (16) is held in the cylinder (11) and is driven by an ignition module (20) to ignite a compressed air/fuel mixture in the combustion chamber (12) to drive the piston (13). A short circuit line (21) is provided on the ignition module (20) for switching off the ignition. The short circuit line (21) is configured as a bus line (30) in order to make available, in a simple manner, a plurality of further operating parameters to the ignition module. An external control apparatus (23, 24) and/or sensors (25, 26) are connected to the bus line (30). The ignition module (20), as master, controls data traffic on the bus line (30) and permits a data communication on the bus line (30) only when a minimum crankshaft angular distance (A, B) is present at an ignition time point (Z1, Z2) of the ignition module (20).

14 Claims, 2 Drawing Sheets

IGNITION MODULE HAVING A BUS LINE

CROSS REFERENCE TO RELATED APPLICATION

This application claims priority of German patent application no. 10 2009 052 488.6, filed Nov. 9, 2009, the entire content of which is incorporated herein by reference.

FIELD OF THE INVENTION

The invention relates to a portable handheld work apparatus in particular a portable hand-guided work apparatus such as a motor-driven chain saw, cutoff machine, brushcutter, blower apparatus or the like.

BACKGROUND OF THE INVENTION

The above-mentioned hand-guided work apparatus are known in many forms. In the housing of the work apparatus, an internal combustion engine is provided for driving the work tool. A combustion chamber is formed in a cylinder of the internal combustion engine and this combustion chamber is delimited by a piston which drives a crankshaft in rotation. A spark plug is held in the cylinder which delivers an ignition spark via an ignition module at an ignition time point at a given crankshaft angular position in dependence upon the control. The ignition spark ignites an air/fuel mixture compressed in the combustion chamber to drive the piston. A short circuit line is connected on the ignition module for stopping the ignition. The short circuit line is to be connected to ground for switching off the internal combustion engine.

The short circuit line is, as a rule, connected to ground via a switch, key switch or the like and short circuits the ignition in this way so that the ignition module can no longer trigger any ignition sparks. The internal combustion engine stops operating and comes to standstill.

The development of the drive technology in work apparatus has led to complex ignition modules which not only consider the rpm for determining an ignition time point for the next crankshaft revolution but also other operating parameters such as the temperature of the internal combustion engine, the position of the throttle flap, the pressure in the the crankcase, et cetera. All this additional information must be supplied to the ignition module, so that the latter, while considering the different parameters, can compute the ignition time point of a next crankshaft revolution or read it out of a characteristic diagram.

SUMMARY OF THE INVENTION

It is an object of the invention to improve a work apparatus of the kind described above having an ignition module in such a manner that operating parameters, which are detected in a simple manner by sensors or the like, are made available to the ignition module.

The portable handheld work apparatus of the invention includes: a work tool; an internal combustion engine for driving the work tool; the engine including a crankshaft; the engine further including a cylinder and a piston conjointly delimiting a combustion chamber for driving the crankshaft in rotation; an ignition module; a spark plug connected to the ignition module and held in the cylinder to deliver an ignition spark to a compressed air/fuel mixture in the cylinder when driven via the ignition module at an ignition time point in a predetermined crankshaft angular position to ignite the compressed air/fuel mixture to drive the piston; a short circuit line connected to the ignition module for switching off the ignition; the short circuit line being configured as a bus line; a plurality of components connected to the bus line; and, the ignition module being a master for controlling the data traffic on the bus line so as to permit a data communication only when a pregiven minimum crankshaft angular distance (A, B) is present at an ignition time point (Z1, Z2) determined by the ignition module.

The short circuit line is only utilized when the internal combustion engine is to be switched off. During operation of the internal combustion engine, the short circuit line has no functional significance so that it can be used as a bus line. An external control apparatus and/or sensors or actuators can be connected to this bus line. The ignition module controls the bus system as master and allows any data communication on the bus line between the master and slaves only when at least a minimum crankshaft angle distance is present to an ignition time point of the ignition module.

The ignition module knows the ignition time point of the next crankshaft revolution because it has determined the ignition time point from the different parameters. Each triggering of an ignition spark on the high voltage line to the spark plug generates disturbance pulses in the short circuit line. For this reason, the ignition module, as master, permits data traffic on the bus line if and only if the disturbances triggered by the ignition have decayed on the short circuit line or have not yet been built up. This can take place in a simple manner in that the given minimal crankshaft angular distance is disposed after a triggered ignition, or a given minimal crankshaft angular distance lies ahead of a triggered ignition. A given minimal crankshaft angular distance (measured in crankshaft angular degrees) is understood to be the distance from the ignition spark or a distance from the disturbance triggered by the ignition spark. This given minimal distance is in each case dimensioned such that the data traffic ends, at the latest, with the triggering of the ignition spark, that is, before the build-up of a disturbance pulse, and is resumed only when the disturbance triggered by the ignition spark has decayed after some crankshaft angular degrees. In this way, it is ensured that a transmitted data packet is not falsified by disturbance pulses of the ignition or is not readable so that reception of the data is disturbed.

Preferably, the ignition module as master determines time-dependent communication slots which extend over a crankshaft rotational angle of the crankshaft. The ignition module permits data traffic on the bus line only within the communication slots. In this way, one or several communication slots can be provided over a crankshaft revolution. As a practical matter, processing pauses are inserted between communication slots within which master and slaves can process the received data or can process data for transmission.

According to a further embodiment of the invention, the bus line is used also to transmit energy between the master and the slaves. For example, the energy can be made available via an increased signal level of the data packet or also be carried out as an energy packet separated from the data packets.

It is practical when the bus used is a LIN-bus (Local Interconnect Network) having a corresponding communication protocol.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
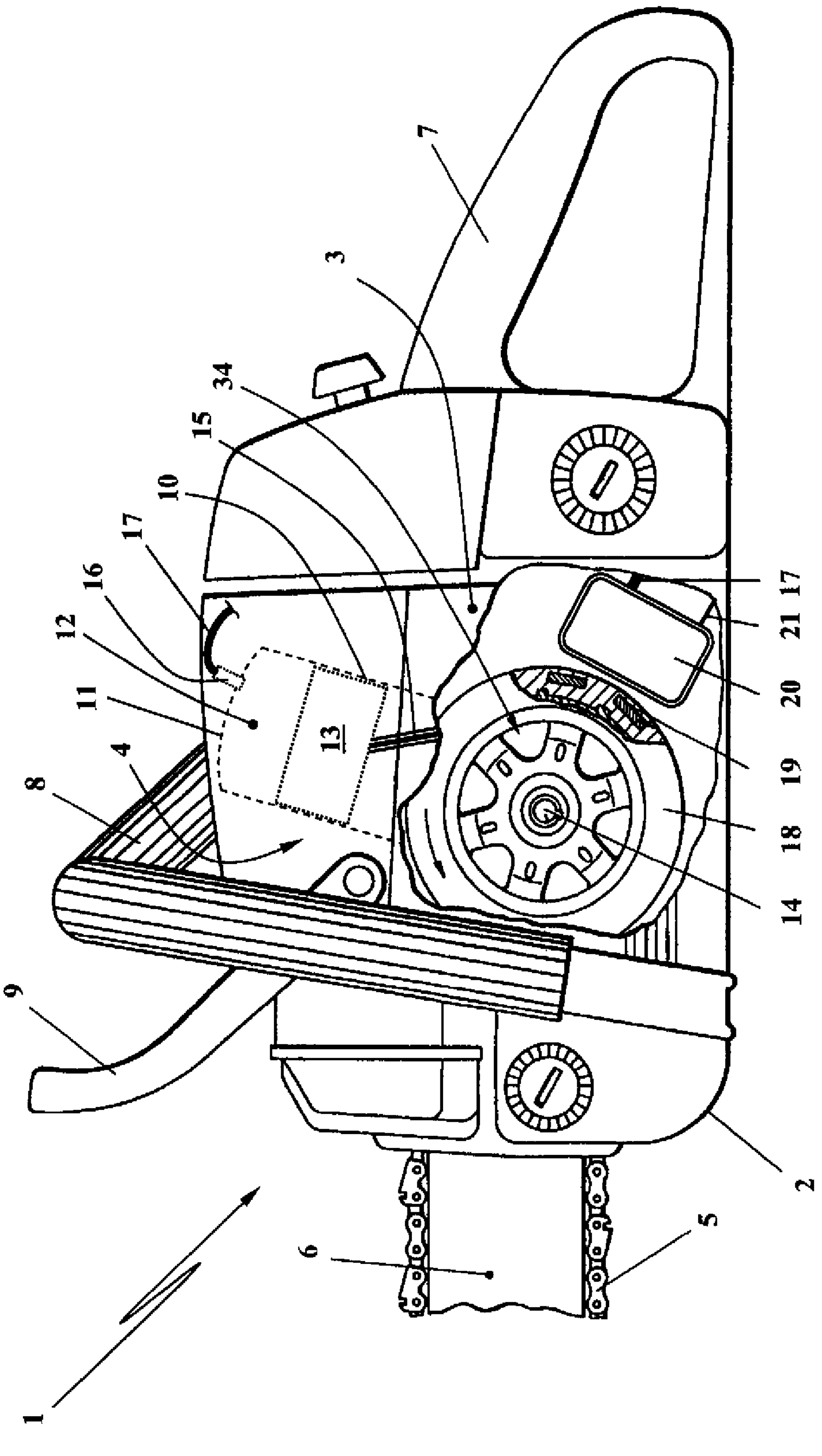
FIG. 1 is a schematic view of a portable hand-guided work apparatus shown as a motor-driven chain saw by way of example.

The portable hand-guided work apparatus shown in FIG. 1 is a portable hand-guided work apparatus 1 which is configured as a motor-driven chain saw 2. The portable hand-guided work apparatus 1 can also be a cutoff machine, brushcutter, blower apparatus or like work apparatus.

In the housing 3 of the work apparatus 1, a drive unit 4 is mounted which drives a work tool 5 shown in the embodiment of FIG. 1 as a saw chain moving along a guide bar 6. The work apparatus 1 includes a rear handle 7 which extends in the same direction as the guide bar 6, namely, in the longitudinal direction of the work apparatus 1 and includes operator-controlled elements for actuating the drive motor 4, which elements are not shown in more detail.

A front handle 8 is fixed to the housing 3. The front handle 8 is configured as a bow-type handle and is spaced apart from the housing 3. A pivotal hand guard 9 is disposed ahead of the front handle 8 and functions as a trigger of a safety brake arrangement for the work tool 5.

The drive unit 4 is an internal combustion engine 10 as shown schematically in FIG. 1. The internal combustion engine 10 is preferably a two-stroke engine and in particular a single-cylinder two-stroke engine. Other motors, such as a mixture-lubricated four-stroke engine, can also be used. The internal combustion engine 10 includes a cylinder 11 wherein a combustion chamber 12 is formed. The combustion chamber 12 is delimited by a piston 13 which rotationally drives a crankshaft 14 supported in the crankcase of the internal combustion engine 10. For this purpose, in the embodiment, the crankshaft 14 is connected to the piston 13 via a corresponding connecting rod 15.

As is conventional in slot-controlled two-stroke engines, the piston 13 controls the mixture inlet, the exhaust-gas outlet as well as the transfer channels which connect the crankcase to the combustion chamber 12. An ignitable air/fuel mixture is supplied to the combustion chamber 12 via the channels. The ignitable air/fuel mixture is compressed upon the upward stroke of the piston 13 and is ignited by an ignition spark of a spark plug 16 in order to downwardly drive the piston 13 for the next crankshaft revolution. The spark plug 16 is disposed in the cylinder 11 and projects with its ignition electrodes in the combustion chamber 12—preferably in the head region of the cylinder 11.

The ignition spark 35 (FIG. 3) at the spark plug 16 is triggered by an ignition module 20 which is connected to the spark plug 16 via a high voltage line 17. In the illustrated embodiment, the ignition module 20 is mounted in the housing 3 of the work apparatus 1 close to the periphery of a rotating magnetic wheel 18. The magnetic wheel, for example, can be configured as a fan wheel for generating a cooling-air flow. At least one magnet 19 is mounted in the magnetic wheel 18, which magnet induces a voltage in an induction coil provided in the ignition module 20. The generator 34 configured in this manner is defined by the magnetic wheel 18 rotating with the crankshaft 14 and the induction coil mounted in the ignition module 20. This generator not only provides the ignition energy for the ignition spark 35 (FIG. 3) at the spark plug 16 but, when designed correspondingly, can also provide the necessary electrical energy for the voltage supply of the ignition module 20, such as for sensors, actuators or other intelligent external control apparatus mounted on the internal combustion engine 10.

Figure 2:
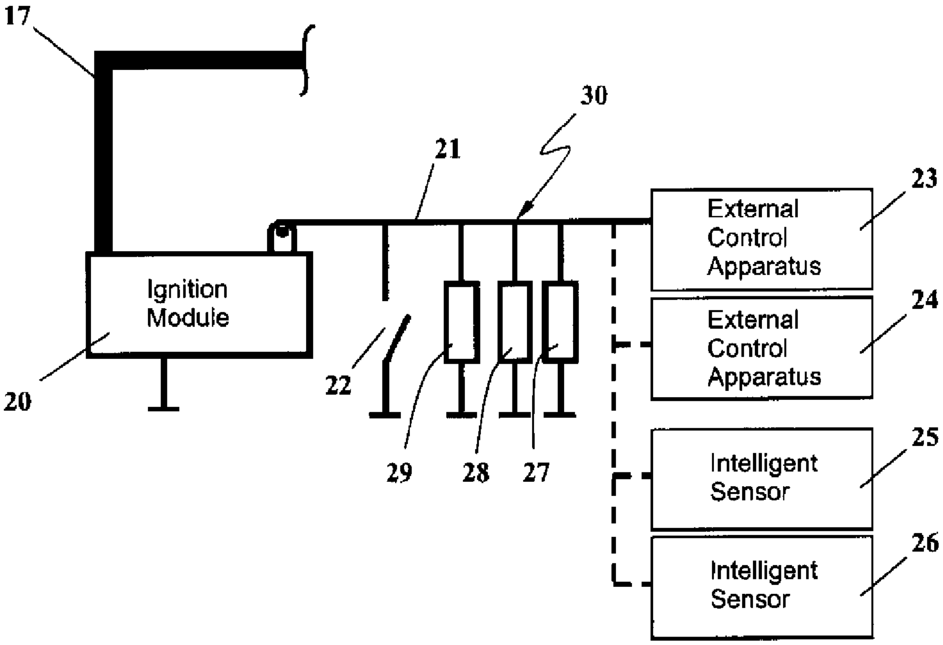
FIG. 2 is a schematic block diagram of the ignition module having a short circuit line configured as a bus line; and, FIG. 3 is a schematic representation of the signal courses plotted as a function of the rotational position of the crankshaft.

The ignition module includes a short circuit line 21 which can be connected to ground via a switch 22 (see FIG. 2). If the switch 22 is closed, the ignition module is short circuited, that is, the internal combustion engine 10 is switched off. No ignition sparks can be generated at the spark plug 16.

If the switch 22 is open, the ignition module 20 is in its operating state in which the ignition module triggers an ignition spark at an ignition time point in a given crankshaft angular position in dependence upon rpm and/or the load.

The short circuit line 21 is therefore needed for operating the engine only when the engine is intended to be switched off, that is, the hand-guided work apparatus 1 is to be turned off. During the operating state, the switch 22 is open so that, in accordance with the invention, the short circuit line 21 can be used as a communication line between the ignition module 20 and external control apparatus (23, 24) or intelligent sensors (25, 26).

According to the invention, in the operating state of the work apparatus, the short circuit line 21 is configured as a bus line 30, especially as a LIN-bus. On the bus line 30, an exchange of information takes place between the ignition module 20 and the external control apparatus (23, 24) and/or the intelligent sensors (25, 26) or even passive resistors 27 as consumers. That is, data are transmitted and received in both directions.

Figure 3:
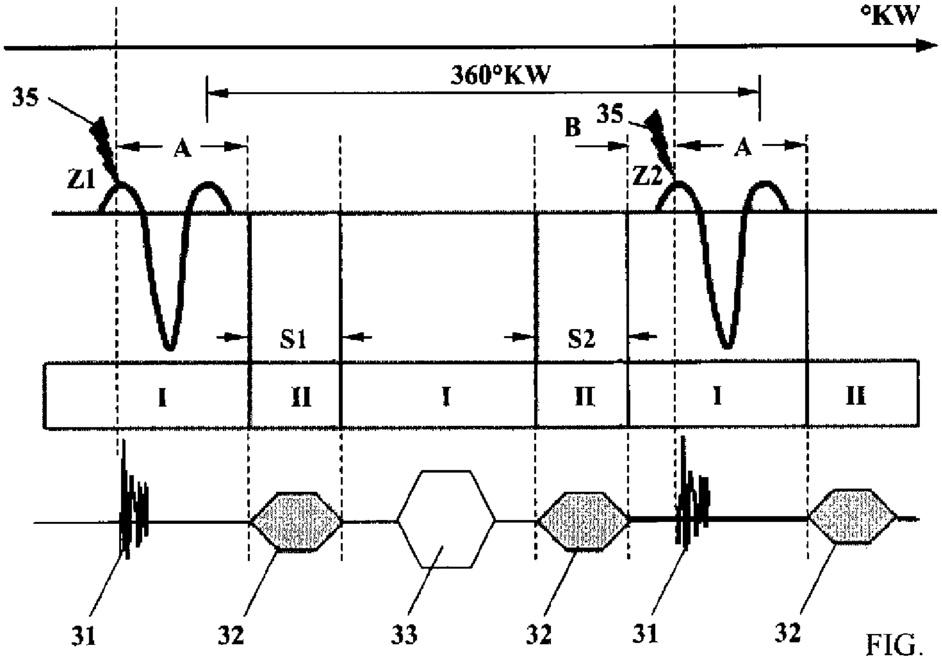

Disturbance pulses are generated in the bus line 30 with the triggering of the ignition sparks 35 at the spark plug 16 because of the ignition (FIG. 3). For this reason, in accordance with the invention, the ignition module 20 is connected as the master of the bus line 30 so that the ignition module 20 permits data communication on the bus line 30 only when there is a minimum crankshaft angular distance A or B (FIG. 3) at an ignition time point (Z1, Z2) of the ignition module 20. The minimum crankshaft angular distance A after an ignition time point (Z1, Z2) is greater than the minimum crankshaft angular distance B ahead of an ignition time point Z2. This is due to the fact that after an ignition, the disturbance pulses 31 (FIG. 3) must first decay before a data packet 32 can be sent on the bus line 30.

As FIG. 3 shows, each data packet 32 lies in a time-dependent communication slot (S1, S2) whose start lies after the minimum crankshaft angular distance A after an ignition Z1 and whose end lies at a distance ahead of a next ignition Z2, which distance does not lie less than the minimum crankshaft angular distance B ahead of an ignition Z2. In this way, data packets 32 can be transmitted over a crankshaft revolution of 360° crankshaft angle at specific points in time or crankshaft angle positions, in which the disturbance pulses 31 have decayed or have not yet occurred.

As FIG. 3 shows, two communication slots S1 and S2 result, for example, over one crankshaft rotation. These communication slots represent a time domain II with active data traffic on the bus line 30. The time domains I lie between the domains II having intensive data traffic. In the time domains I, the ignition module 20 prevents data traffic. During these time domains I, the data received can be processed, ignition sparks transmitted, algorithms computed or other consumers activated.

The magnitude of a given minimal crankshaft angular distance at the ignition time point (measured in crankshaft angle degrees) is determined in accordance with the disturbances which occur on the data line. Thus, the minimum crankshaft angular distance B ahead of an ignition is so great that the data traffic will be ended at the latest when the ignition spark is triggered or a disturbance pulse triggered by the ignition spark begins to build up. In the embodiment, the given crankshaft angular distance B is dimensioned in such a manner that it begins some angular degrees ahead of an ignition spark so that a safety distance to the disturbance 31 is given. In FIG. 3, a crankshaft angle distance of approximately 30° KW is provided.

The magnitude of a pregiven minimal crankshaft angular distance A after a triggered ignition spark 35 is determined after the decay of the disturbance pulse 31 generated by the ignition spark 35. The distance A to the ignition time point is dimensioned such that the disturbance triggered by the ignition sparks has decayed after some crankshaft angle degrees. In the embodiment of FIG. 3, the given crankshaft angular distance A is dimensioned in such a manner that it ends some angular degrees after the decay of the disturbance 31 so that a safety distance to the disturbance 31 is given. In FIG. 3, a crankshaft angular distance A of approximately 80° KW is provided.

The magnitude of the minimum crankshaft angular distance A or B after or before an ignition is dependent upon the line guidance of the short circuit line as well as the high voltage cable to the ignition sparks. The values of the minimum crankshaft angular distance can lie between 0° KW and approximately 300° KW. Correspondingly, the result will be a narrow or a wide communication slot S1 or S2.

In any case, the ignition module 20 controls the data traffic on the bus line 30 as master. The ignition module 20 has knowledge as to the time-dependent sequence of all data to be transmitted. These data are transmitted by the corresponding external control apparatus (23, 24) or intelligent sensors 25 and 26 as slaves only when they are requested to do so by the ignition module 20 as master. This request takes place via the transmission of a specific identifier to the particular slave. The ignition module "knows" when disturbances 31 can occur on the bus line 30 due to the detected ignition time points Z1 and Z2.

As external control apparatus (23, 24), for example, control apparatus for electric starting, for handle heating and carburetor heating and for other comfort functions can be provided. Intelligent sensors (25, 26) can, for example, be mounted for detecting temperatures, pressures, et cetera. Because of the digital communication, pressure sensors, for example, can be optimally calibrated in the sensor and transmit their information to the master (ignition module 20) free of disturbance.

It is further possible to evaluate a limited number of simple passive resistors 27, RLC-Networks 28 or active loads 29 (diodes, transistors), for example, as throttle flap potentiometers, switch status recognition or line interruption detection by means of suitably dimensioning the electric signal level and currents on the bus line 30 as well as the input impedances of the control apparatus.

According to another embodiment of the invention, the bus line 30 can be provided to transport energy between the ignition module 20 and the external control apparatus (23, 24) and/or the sensors (25, 26) or actuators. Thus, an energy excess occurring, for example, in the network of the bus system, can be exchanged between the units connected to the bus line 30. This can be used to maintain the communication as well as to improve the primary function (for example, generation of the ignition spark). If an electric battery is provided in the arrangement, excess energy can be stored intermediately in the battery in this manner.

The energy can, for example, be made available via an increased signal level or can also be transmitted as an energy packet 33. Here, it can be expedient to transmit the energy packet 33 in the time domains I between the communication slots (S1, S2). A transmission within a communication slot in lieu of a data packet 32 can also be practical.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:
a work tool;
an internal combustion engine for driving the work tool;
said engine including a crankshaft;
said engine further including a cylinder and a piston conjointly delimiting a combustion chamber for driving said crankshaft in rotation;
an ignition module;
a spark plug connected to said ignition module and held in said cylinder to deliver an ignition spark to a compressed air/fuel mixture in said cylinder when driven via said ignition module at an ignition time point in a predetermined crankshaft angular position to ignite said compressed air/fuel mixture to drive said piston;
a short circuit line connected to said ignition module for switching off the ignition;
said short circuit line being configured as a bus line;
a plurality of components connected to said bus line; and,
said ignition module being a master for controlling the data traffic on said bus line so as to permit a data communication only when a pregiven minimum crankshaft angular distance (A, B) is present at an ignition time point (Z1, Z2) determined by said ignition module.

2. The portable handheld work apparatus of claim 1, wherein said minimum crankshaft angular distance (A) lies after a triggered ignition (Z1, Z2).

3. The portable handheld work apparatus of claim 2, wherein said minimum crankshaft angular distance (A) is so dimensioned that the disturbance, which is triggered by the ignition sparks, is decayed.

4. The portable handheld work apparatus of claim 1, wherein said minimum crankshaft angular distance (B) lies ahead of a triggered ignition (Z2).

5. The portable handheld work apparatus of claim 4, wherein the minimum crankshaft angular distance (A) is so dimensioned that the disturbance, which is anticipated because of the ignition sparks, has not yet formed.

6. The portable handheld work apparatus of claim 1, wherein said data communication is transmitted on said bus line as a data packet; and, said data packet lies in a communication slot determined by a crankshaft angular region.

7. The portable handheld work apparatus of claim 6, wherein said communication slot extends over a crankshaft angle of approximately 40° to 70°.

8. The portable handheld work apparatus of claim 6, wherein said communication slot extends over a crankshaft angle of approximately 55°.

9. The portable handheld work apparatus of claim 1, wherein said bus line is used for exchanging energy between said ignition module as master and said components.

10. The portable handheld work apparatus of claim 9, wherein said data communication is transmitted on said bus line as a data packet; and, said energy is made available by an increased signal level of said data packet.

11. The portable handheld work apparatus of claim 9, wherein said data communication is transmitted on said bus line as a data packet; and, said energy is made available as an energy packet separate from said data packet.

12. The portable handheld work apparatus of claim 1, wherein said bus line is a local interconnect network bus.

13. The portable handheld work apparatus of claim 1, wherein said components comprise an external control apparatus and at least one of a sensor and actuator.

14. The portable handheld work apparatus of claim 1, wherein said portable handheld work apparatus is a motor-driven chain saw.

* * * * *